T. E. MURRAY, Jr., AND J. B. MURRAY.
METHOD OF PRODUCING LONGITUDINAL RIBS ON THE EXTERIORS OF TUBES.
APPLICATION FILED DEC. 24, 1919.

1,339,970.

Patented May 11, 1920.

Inventors
Thomas E. Murray Jr.
Joseph B. Murray Jr.
By their Attorney

UNITED STATES PATENT OFFICE.

THOMAS E. MURRAY, JR., AND JOSEPH B. MURRAY, OF BROOKLYN, NEW YORK.

METHOD OF PRODUCING LONGITUDINAL RIBS ON THE EXTERIORS OF TUBES.

1,339,970.  Specification of Letters Patent.  Patented May 11, 1920.

Application filed December 24, 1919. Serial No. 347,214.

*To all whom it may concern:*

Be it known that we, THOMAS E. MURRAY, Jr., and JOSEPH B. MURRAY, citizens of the United States, residing at Brooklyn, in the county of Kings and State of New York, have invented a certain new and useful Improvement in Methods of Producing Longitudinal Ribs on the Exteriors of Tubes, of which the following is a specification.

The invention is a method of forming longitudinal ribs on a tube by electrically heating certain portions of said tube, while subjecting said portions to compression to extrude the same outwardly.

In the accompanying drawing—

Figure 1:
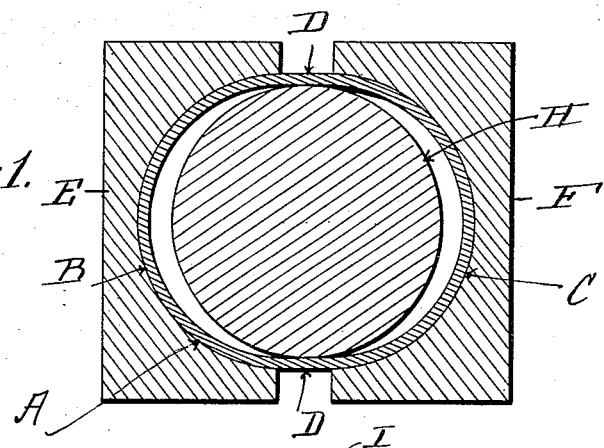
Figure 2:
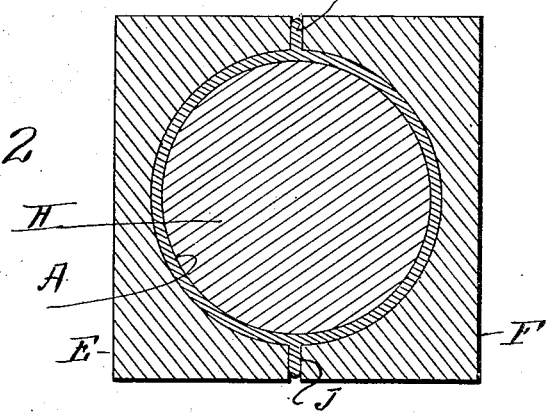
Figure 3:
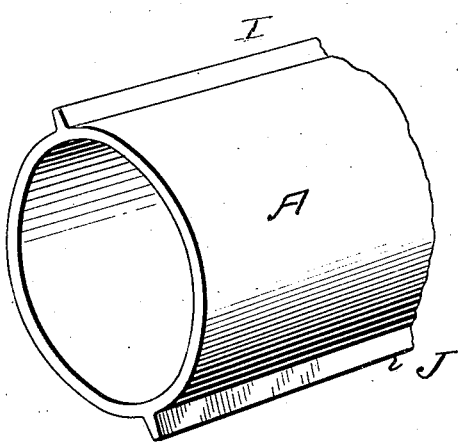
Figure 4:
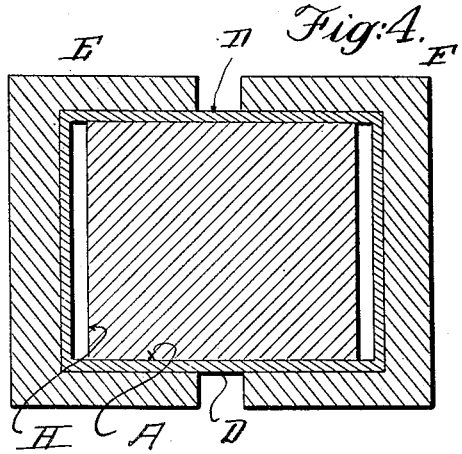

Figure 1 is a cross section of the electrodes, the tube therein and the mandrel within the tube before the flanging operation. Fig. 2 is a similar view, after the flanging operation is completed. Fig. 3 is a perspective view of the tube with the flanges formed thereon. Fig. 4 is a view similar to Fig. 1, showing a tube of modified cross section.

Similar letters of reference indicate like parts.

A is the tube, which, as here shown in cross section, comprises two semi-cylindrical portions B, C, with intervening portions D. The semi-cylindrical portions B, C are seated in the electrodes E, F, with the portions D bridging the gap between said electrodes. Within the tube is inserted the cylindrical mandrel H, preferably of refractory non-conducting material. The electrodes are to be relatively movable to compress the portions B, C simultaneously.

When the heating current is established and the electrodes E, F are caused to compress the metal of the portions B, C fused thereby, said metal is prevented from becoming inwardly extruded by the mandrel H, and is, therefore, outwardly extruded to form longitudinal ribs I, J on the tube. The width of the ribs will depend upon the permitted degree of approximation of the opposing faces of the electrodes. The tube may be of any desired cross sectional shape—as, for example, quadrangular, as shown in Fig. 4, the electrodes and mandrel being correspondingly formed.

We claim:

The method of producing longitudinal ribs on the exterior of a tube, which consists in seating the tube in electrodes having a gap between their opposing faces, while internally supporting the portions of said tube bridging said gap, establishing a heating current, and moving said electrodes relatively to one another, whereby the metal of said bridging portions is fused and extruded to form said external ribs.

In testimony whereof we have affixed our signatures in presence of two witnesses.

THOMAS E. MURRAY, JR.
JOSEPH B. MURRAY.

Witnesses:
GERTRUDE T. PORTER,
MAY T. McGARRY.